R. S. TROTT.
LUBRICATING AND PACKING SYSTEM FOR EXPLOSIVE ENGINES.
APPLICATION FILED JULY 10, 1909.
992,458.
Patented May 16, 1911.
2 SHEETS—SHEET 1.
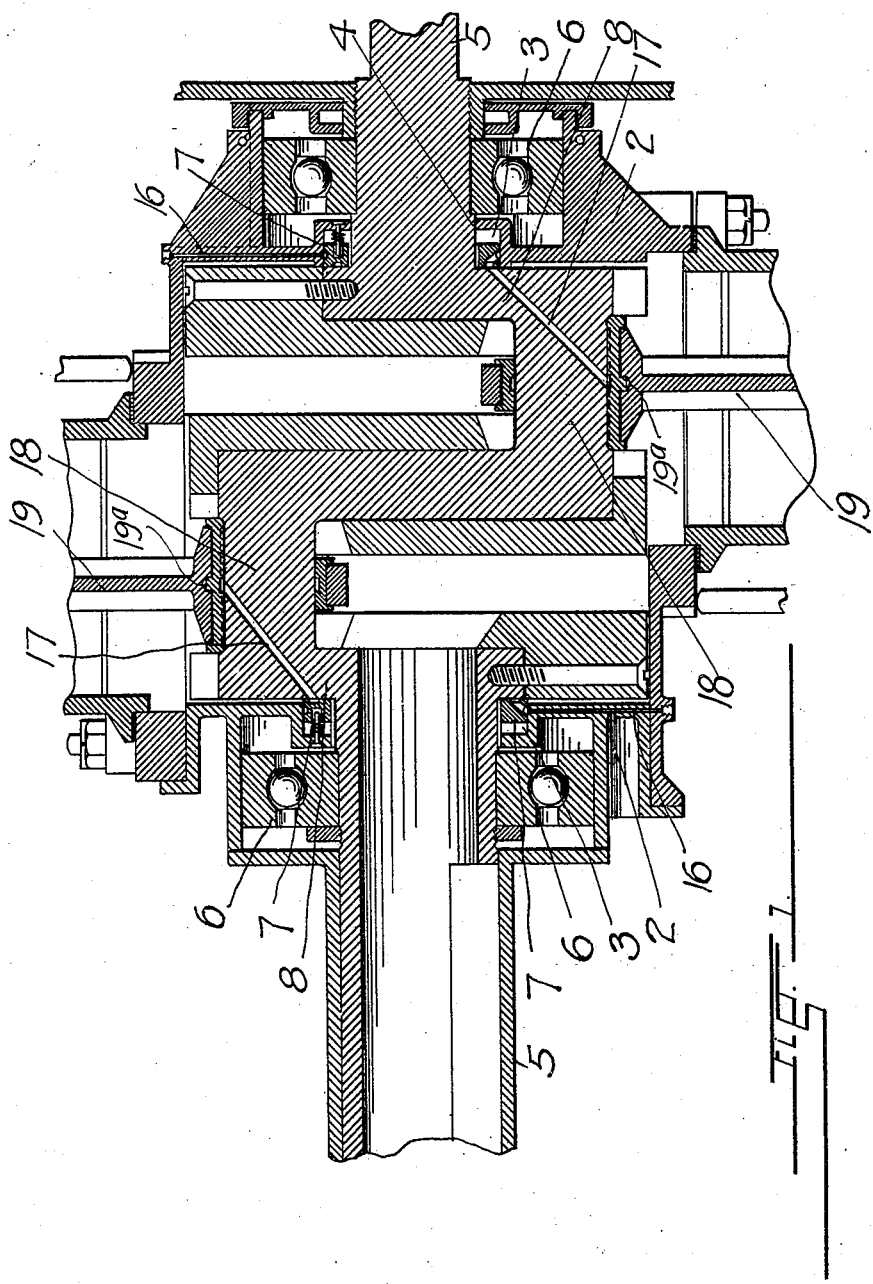
WITNESSES:
M. L. Geary
F. H. Cuno.
INVENTOR.
R. S. Trott
BY
ATTORNEY.

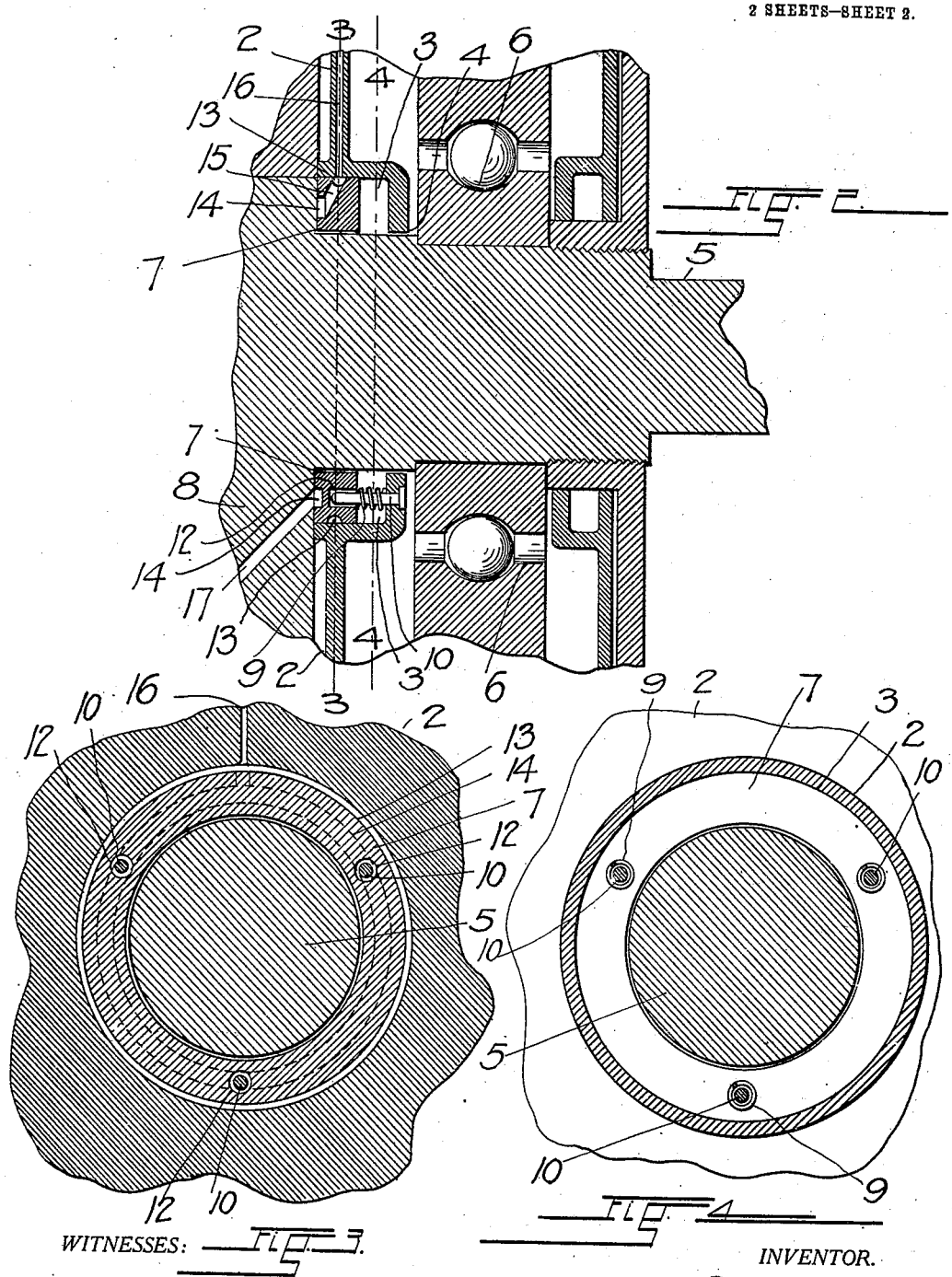

UNITED STATES PATENT OFFICE.

ROLLAND S. TROTT, OF DENVER, COLORADO.

LUBRICATING AND PACKING SYSTEM FOR EXPLOSIVE-ENGINES.

992,458.  Specification of Letters Patent.  Patented May 16, 1911.

Application filed July 10, 1909. Serial No. 506,863.

*To all whom it may concern:*

Be it known that I, ROLLAND S. TROTT, citizen of the United States of America, residing at Denver, in the county of Denver and State of Colorado, have invented certain new and useful Improvements in Lubricating and Packing Systems for Explosive-Engines, of which the following is a specification.

This invention relates to a combined lubricating and packing system for explosive engines and more particularly for engines of the two cycle type in which an air tight condition of the crank case is essential.

The object of my invention resides in the provision of simple and highly effective means whereby the joints between the circumferential surface of the crank shaft and the openings in the crank casing through which the latter projects, shall be rendered air tight while by the same means the crank pin and the said joints will be continuously supplied with lubricating fluid. I attain this object by the mechanism illustrated in the accompanying drawings in the various views of which like parts are similarly designated and in which—

Figure 1, represents a fractional, vertical sectional view of the crank-case, the therein revoluble crank and adjoining parts, Fig. 2, a similar view of one side of the crank case and crank, drawn to an enlarged scale, Fig. 3, a transverse section taken along the line 3—3 Fig. 2, and Fig. 4, a similar section taken along the line 4—4 Fig. 2.

Referring to the drawings by numerical reference characters, let the numeral 2 designate the crank case which in my improved construction, is formed with recesses 3 provided with central circular openings 4, through which the crank shaft 5, which is revolubly supported in ball bearings 6 at the outside of the casing, projects.

Rings 7 composed of bronze or other suitable material, are slidably fitted within the recesses 3 and around the therein extending portions of the shaft and are held in resilient engagement with shoulders on the crank arms 8 of said shaft, by means of coiled springs 9 placed between the outer surfaces of the rings and the opposite faces of the respective recesses and around pins 10 which, projecting laterally from the vertical walls of the recesses into corresponding openings 12 in the respective rings, hold the latter against rotatory movement with the shaft. Each ring 7 is provided in its peripheral surface, with a peripheral groove 13 and in its working face, with a similar groove 14, which connects with the first named groove by means of one or more channels 15. The peripheral groove 13 communicates with an oil passage 16 in the wall of the crank case while the groove 14 registers with the mouth of a bore 17 which extends obliquely through the crank arm 8 and the therewith integral crank pin 18, to the latter's circumferential surface.

When the engine is in operation, the lubricating fluid is continuously supplied through the passage 16, into the peripheral grooves 13 of the rings whence it flows through the channels 15, into the circular grooves 14 in the faces of the respective rings to be forced through the bore 17, in between the surface of the crank 18 and the therewith associated connecting rod 19 which is preferably formed with oil grooves 19$^a$. The oil flowing between the peripheral surface of each ring and the surrounding surface of the respective recess as well as between the juxtaposed surfaces of the crank arm and the ring, will render the joints between the parts air-tight while the oil forced through the bore in the crank, will be continuously supplied to the crank pin irrespective of the latter's position with respect to the axis of the shaft.

What I claim and desire to secure by Letters Patent is:—

1. In a system of the class described, a crank-case, a crank-shaft projecting through openings in its sides and having a crank-arm, and a therewith connected crank-pin which are formed with a bore extending between the outer surface of said arm and the circumferential surface of the pin, the said crank-arm being formed to provide a shoulder around the adjacent end of the shaft, and a ring held in resilient contact with said shoulder and having a circular groove in communication with the mouth of said bore, and a peripheral groove communicating with the first-named groove and with an oil passage in the case.

2. In a system of the class described, a crank-case having in its side, a recess provided with a central opening, a crank-shaft projecting through said opening and having a crank-arm and a therewith connected pin which have a bore connecting the outer surface of said arm with the circumferential surface of the pin, the said arm being formed to provide a shoulder around the adjacent end of the shaft, and a ring within said recess, resiliently held in engagement with said shoulder and having a circular groove in communication with the mouth of said bore and a peripheral groove communicating with the first-named groove and with an oil passage in the case.

3. In a system of the class described, a crank-case having in its side, a recess provided with a central opening, a crank shaft projecting through said opening and having a crank-arm formed to provide a shoulder around the adjacent end thereof, a ring within said recess, resiliently held in engagement with said shoulder and having a circular groove in its engaging surface, and a peripheral groove communicating with the first named groove and with an oil passage in the case.

4. In a system of the class described, a crank-case having in its side, a recess provided with a central opening, a crank-shaft projecting through said opening and having a crank-arm formed to provide a shoulder around the adjacent end thereof, a ring within said recess held in engagement with said shoulder and having a circular groove in its engaging surface in communication with an oil passage in the case, and means adapted to hold the ring against rotation with the shaft.

5. In a system of the class described, a crank-case having in its side, a recess provided with a central opening, a crank shaft projecting through said opening and having a crank-arm formed to provide a shoulder around the adjacent end thereof, a ring within said recess, guide pins on said case projecting into openings in the ring, and springs placed between the opposite surfaces of the ring and the recess whereby the former is held in resilient engagement with said shoulder, the said ring having a circular groove in its engaging surface, in communication with an oil passage in the case.

6. In a system of the class described, a crank-case having in its side, a recess provided with a central opening, a crank shaft projecting through said opening and having an arm formed to provide a shoulder around the adjacent end thereof, a ring within said recess resiliently held in engagement with said shoulder, and having a circular groove in its engaging surface and a peripheral groove communicating with the first named groove, and means for introducing a lubricating fluid into said recess.

7. In a system of the class described, a crank shaft revolubly mounted thereon and including a crank arm and a crank pin which have a bore connecting the circumferential surface of the latter with the outer surface of the arm, the said arm being formed to provide a shoulder around the adjacent end of the shaft, a ring engaging said shoulder and having a continuous groove in communication with said bore and a peripheral groove in communication with the first named groove, the said support having means for supplying a lubricant to the said peripheral groove.

8. In a system of the class described, a support, a crank shaft revolubly mounted thereon and having a crank arm formed to provide a shoulder around the adjacent end thereof, and a ring engaging said shoulder and having a continuous groove in its engaging surface and a passage for conducting a lubricant to said groove, the said support having means for supplying a lubricant to said passage.

9. In a system of the class described, a support, a crank-shaft revolubly mounted thereon and having a crank-arm formed to provide a shoulder around the adjacent end thereof, and a ring held resiliently in engagement with said shoulder and having a continuous groove in its engaging surface and a peripheral groove connected therewith, the said support having means for supplying a lubricant to said grooves.

10. In a system of the class described, a support, a crank shaft revolubly mounted thereon and having a crank arm formed to provide a shoulder around the adjacent end thereof and a pin at the extremity of said arm, and a ring held in resilient engagement with said shoulder and provided with a continuous groove in its engaged surface and a peripheral groove connected therewith, said support having means for supplying lubricant to said groove, and means for preventing rotation of the ring with the shaft, and said crank-shaft having an oil passage extending from the face of the arm engaged by said ring to the circumferential face of the pin.

In testimony whereof I have affixed my signature in presence of two witnesses.

ROLLAND S. TROTT.

Witnesses:
   G. J. ROLLANDET,
   M. L. GEARY.

---

Copies of this patent may be obtained for five cents each, by addressing the "Commissioner of Patents, Washington, D. C."